United States Patent
Huang

(10) Patent No.: US 8,479,609 B2
(45) Date of Patent: *Jul. 9, 2013

(54) WALL-MOUNTED FAUCET CONTROL HANDLE

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 40 days.

This patent is subject to a terminal disclaimer.

(21) Appl. No.: 13/206,020

(22) Filed: Aug. 9, 2011

(65) Prior Publication Data

US 2013/0036856 A1 Feb. 14, 2013

(51) Int. Cl.
*F16K 5/00* (2006.01)
*F16K 27/06* (2006.01)

(52) U.S. Cl.
CPC .................................. *F16K 27/06* (2013.01)
USPC .............. 74/543; 74/548; 137/801; 137/359; 137/315.15; 137/625.41; 251/288; 251/323; 4/678

(58) Field of Classification Search
USPC   137/801, 269, 359, 315.15, 625.41; 251/288, 251/323; 74/543–548; 4/678
See application file for complete search history.

(56) References Cited

U.S. PATENT DOCUMENTS

| | | | |
|---|---|---|---|
| 5,979,489 A * | 11/1999 | Pitsch | 137/359 |
| 6,409,148 B1 * | 6/2002 | Dempsey et al. | 251/288 |
| 6,438,771 B1 * | 8/2002 | Donath et al. | 4/678 |
| 7,231,935 B2 * | 6/2007 | Huang | 137/315.15 |
| 7,258,322 B1 * | 8/2007 | Yang | 251/323 |
| 2012/0266991 A1 * | 10/2012 | Huang | 137/801 |

FOREIGN PATENT DOCUMENTS

JP 2006-234050 * 9/2006

* cited by examiner

*Primary Examiner* — Vinh Luong
(74) *Attorney, Agent, or Firm* — Che-Yang Chen; Law Office of Michael Chen

(57) ABSTRACT

A wall-mounted faucet control device includes a control handle and two transforming heads, wherein the control handle has two wedging ribs cross each other at the periphery of an opening of the control handle, and two transforming heads have an inserting slot on one side and a connecting surface on the other side. Two connecting slots cross with each other are recessedly formed at the connecting surface, and the connecting slots are engaged with the wedging ribs of the control handle. According to the disclosed structure, since the control handle's receiving space has detachable transforming heads, the faucet handle in the present invention can be used in different water control bases with different sizes to increase the practicability of the faucet handle, and further increase the convenience during the assembly process.

1 Claim, 7 Drawing Sheets

WALL-MOUNTED FAUCET CONTROL HANDLE

FIELD OF THE INVENTION

The present invention relates to a wall-mounted faucet control handle, and more particularly refers to a receiving space of a control handle having a detachable transforming head, which can be applied to different sizes of water control bases, to increase the applicability of the faucet handle and convenience for assembly.

BACKGROUND OF THE INVENTION

In recent years, the "DIY" style has become popular and people focus more on entire appearance of the faucet, so most people try to replace the faucet handle by themselves start to get rid of the appearance of the old faucet and achieve the goal of changing the exterior of the faucet and eliminating the old thereof. However, various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

SUMMARY OF THE INVENTION

The technical problem to be solved in the present invention is that various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

The technical point to solve the problem mentioned above is that the present invention provides a wall-mounted faucet control device including: a control handle, one side of which recessedly forms a receiving space having two wedging ribs cross each other at the periphery of an opening. A connecting block is protrudingly formed at the periphery of the opening of the receiving space and the connecting block has one through hole that provides a locking unit. The wall-mounted faucet control device also has a first and a second transforming heads that have an inserting slot recessedly formed at one side of the transforming heads, while a connecting surface is formed expandably on the other side thereof. Two connecting slots cross with each other are recessedly formed at the connecting surface, and the connecting slots are engaged with the wedging ribs of the control handle. Furthermore, a recessed slot formed at the cross point of the connecting slots connects with the inserting slot and provides a screw locking unit. The transforming heads extendedly and downward form a connecting portion that has a connecting hole therethrough, and the connecting hole is provided for the locking unit of the control handle to lock. A stopping block is extendedly formed on both sides of the connecting portion of the first transforming head, while a stopping rib is extendedly formed near the top of the inserting slot of the second transforming head. As such, the wall-mounted faucet control device is formed.

The present invention provides a wall-mounted faucet control device that is advantageous because the receiving space of the control handle has detachable transforming head, so the faucet handle in the present invention can be used in different water control bases with different sizes to increase the practicability of the faucet handle, and further increase the convenience during the assembly process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
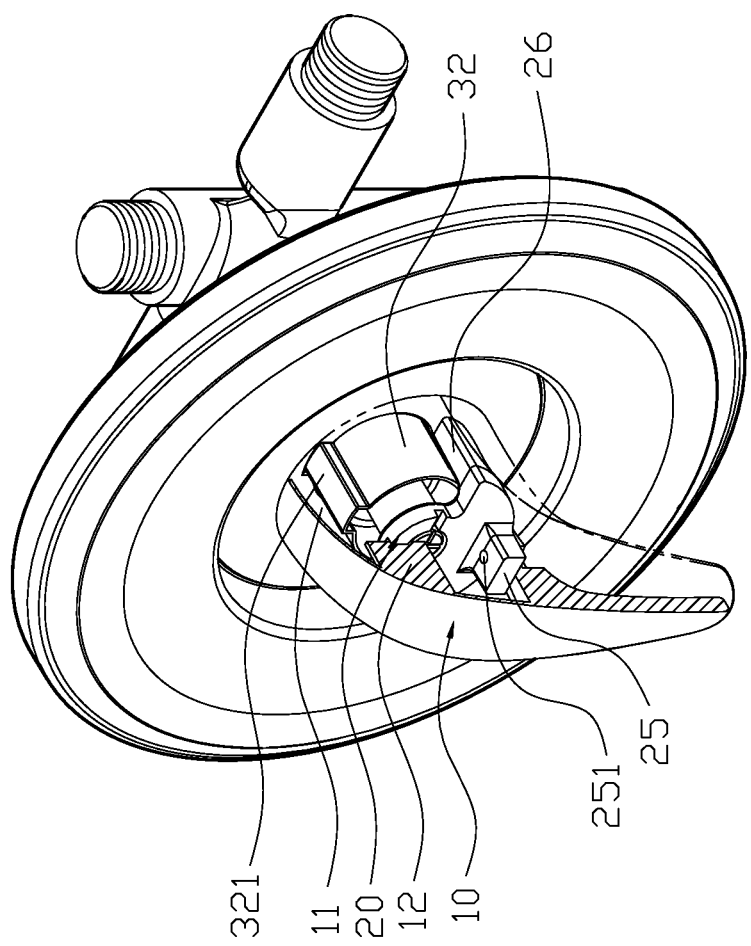
FIG. 1 illustrates a three-dimensional assembled view in the present invention.
Figure 2:
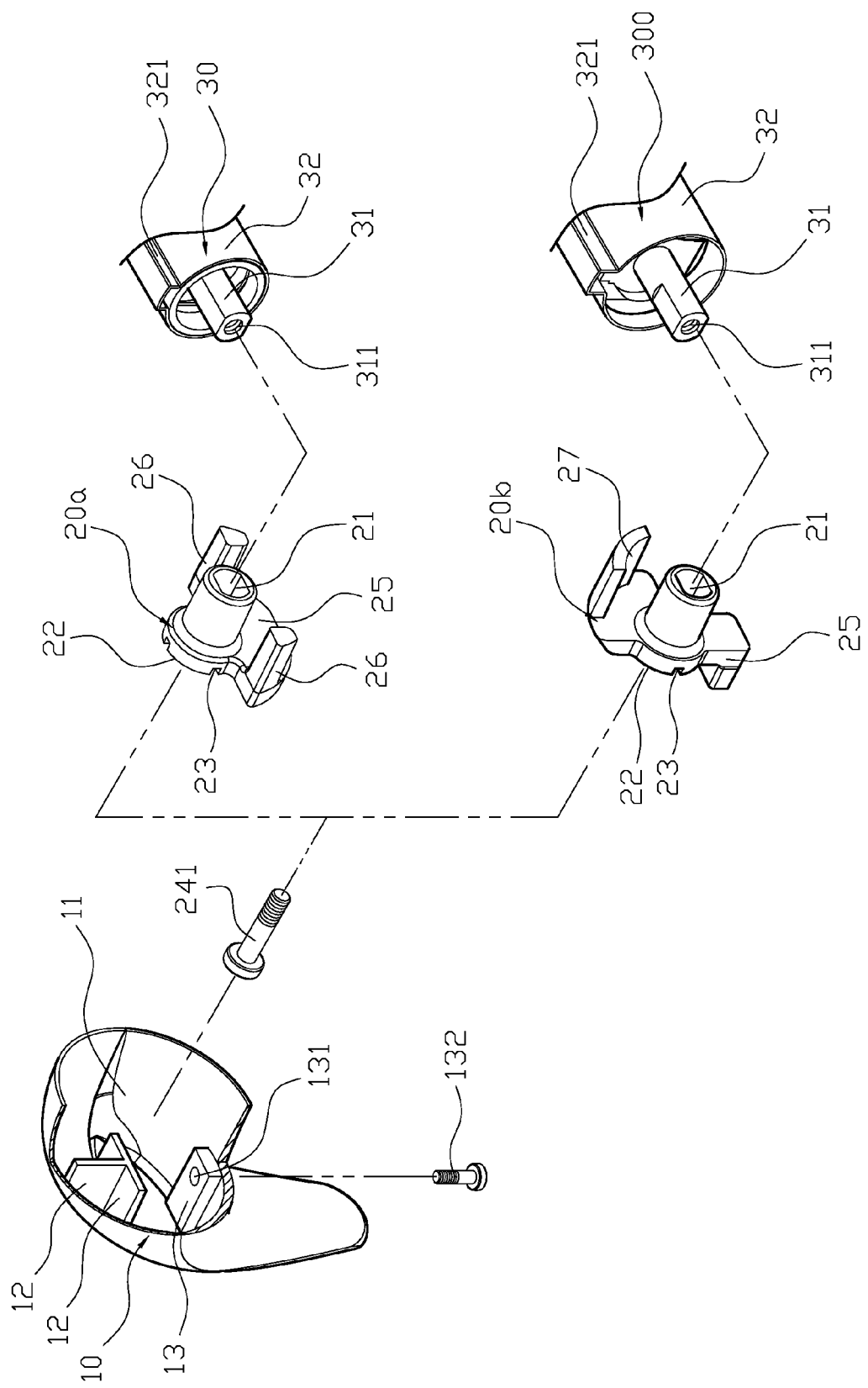
FIG. 2 illustrates a three-dimensional exploded view in the present invention.
Figure 3:
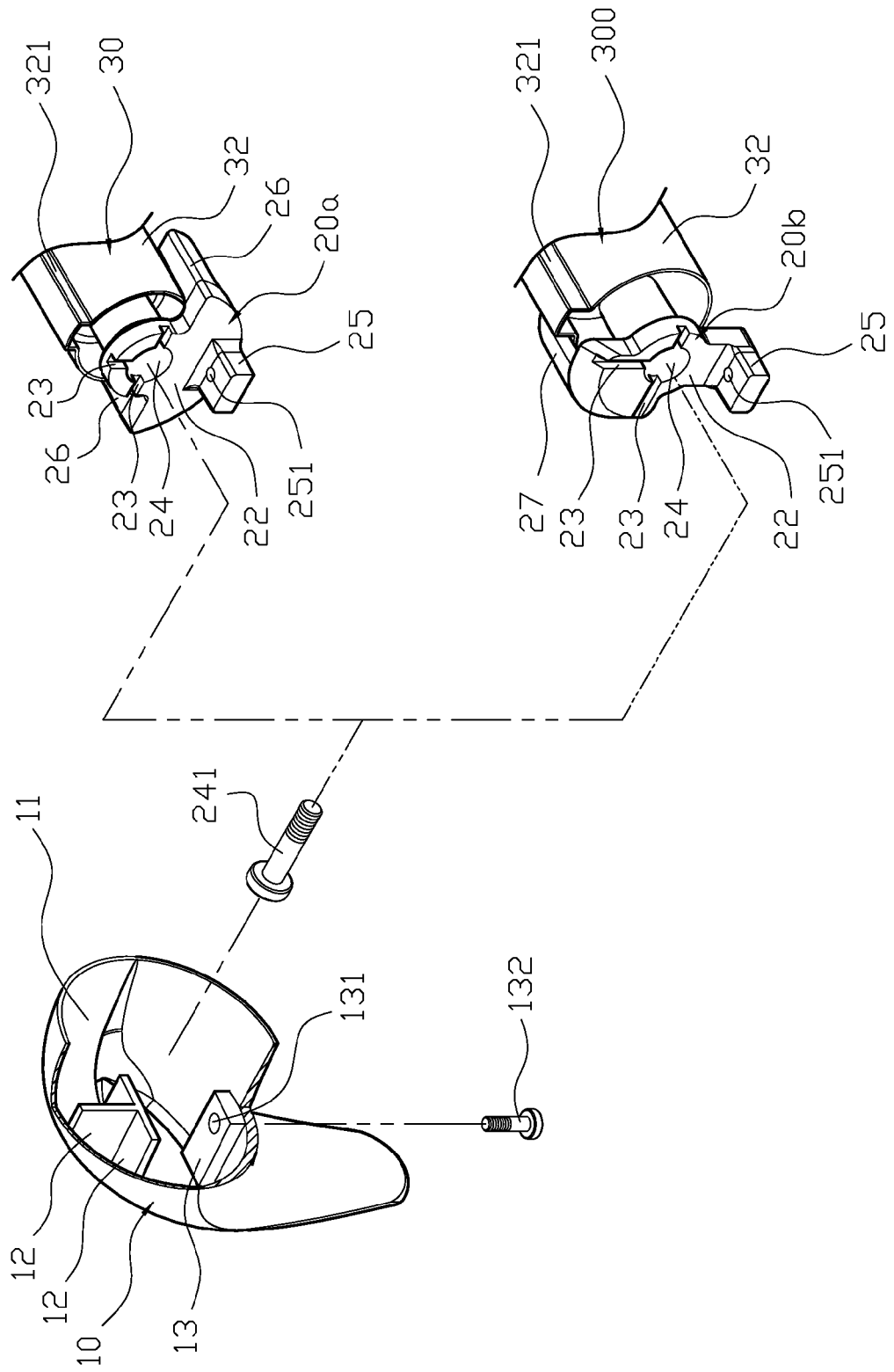
FIG. 3 illustrates a schematic view of the assembly of the faucet in the present invention.
Figure 4:
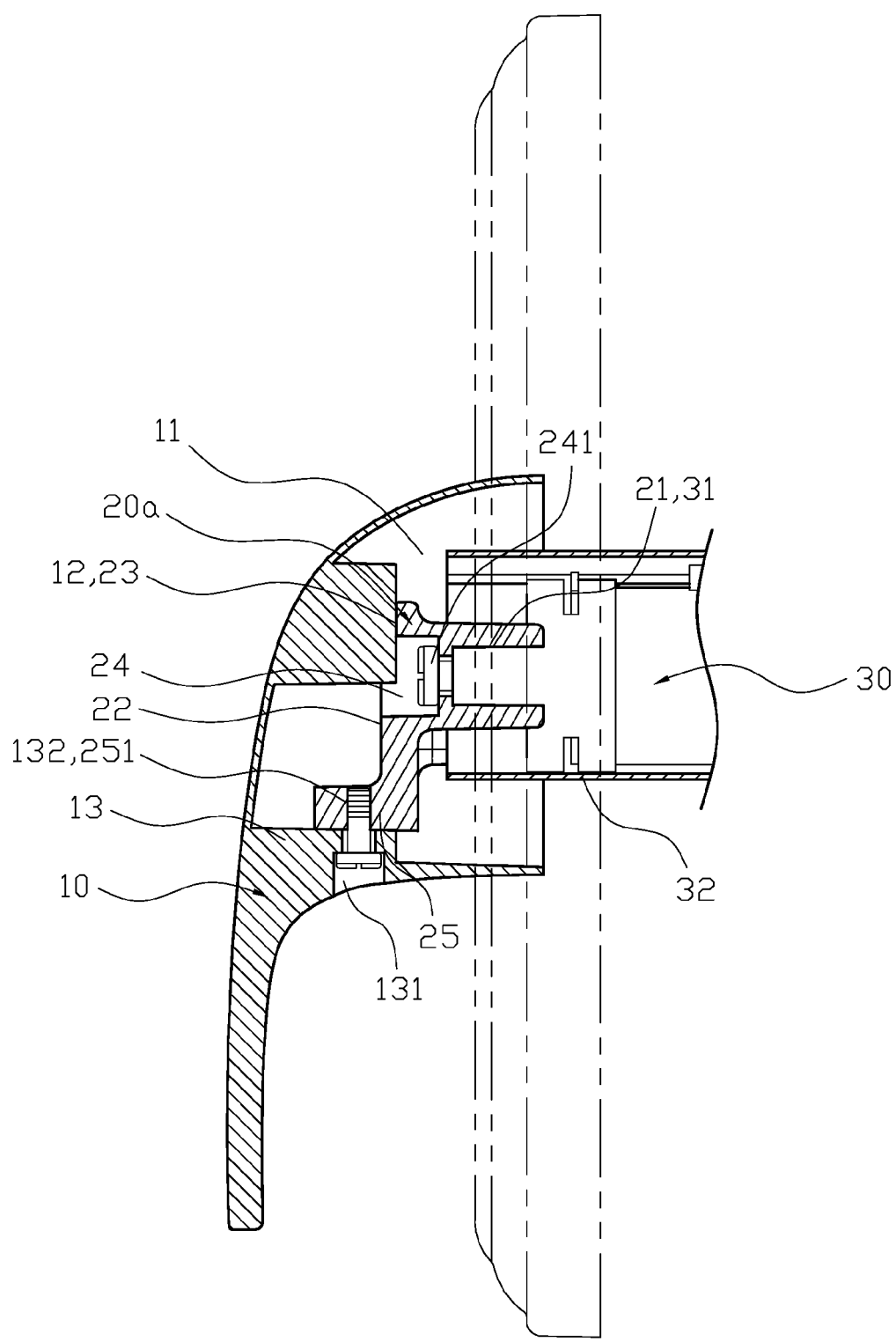
FIG. 4 illustrates a sectional view of the first assembly type in the present invention.

In order to further understand the goal, characteristics and effect of the present invention, a number of embodiments along with the drawings are illustrated as following:

Referring to FIGS. 1 to 3, a wall-mounted faucet control device includes: a first control handle (10), a first transforming head (20a) and a second transforming head (20b), wherein one side of the control handle (10) recessedly forms a receiving space (11) that has two protruding wedging ribs (12) cross each other at the opening end of the receiving space (11), and has a connecting block (13) protrudingly located at the periphery of the opening end thereof. The connecting block has a through hole (131) providing a locking unit (132). The transforming heads (20a) (20b) recessedly form an inserting slot (21) on one side, while a connecting surface (22) is formed expandably at the other side. Two connecting slots (23) cross with each other are recessedly formed at the connecting surface (22), and the connecting slots (23) are engaged with the wedging ribs (12) of the control handle (10). Furthermore, a recessed slot (24) formed at the cross point of the connecting slots (23) connects with the inserting slot (21) and provides a screw locking unit (241). The transforming heads (20a) (20b) extendedly and downward form a connecting portion (25) that has a connecting hole (251) therethrough, and the connecting hole (251) is provided for the locking unit (132) of the control handle (10) to lock. A stopping block (26) is extendedly formed on both sides of the connecting portion (25) of the first transforming head (20a), while a stopping rib (27) is extendedly formed near the top of the inserting slot (21) of the second transforming head (20b).

Figure 5:
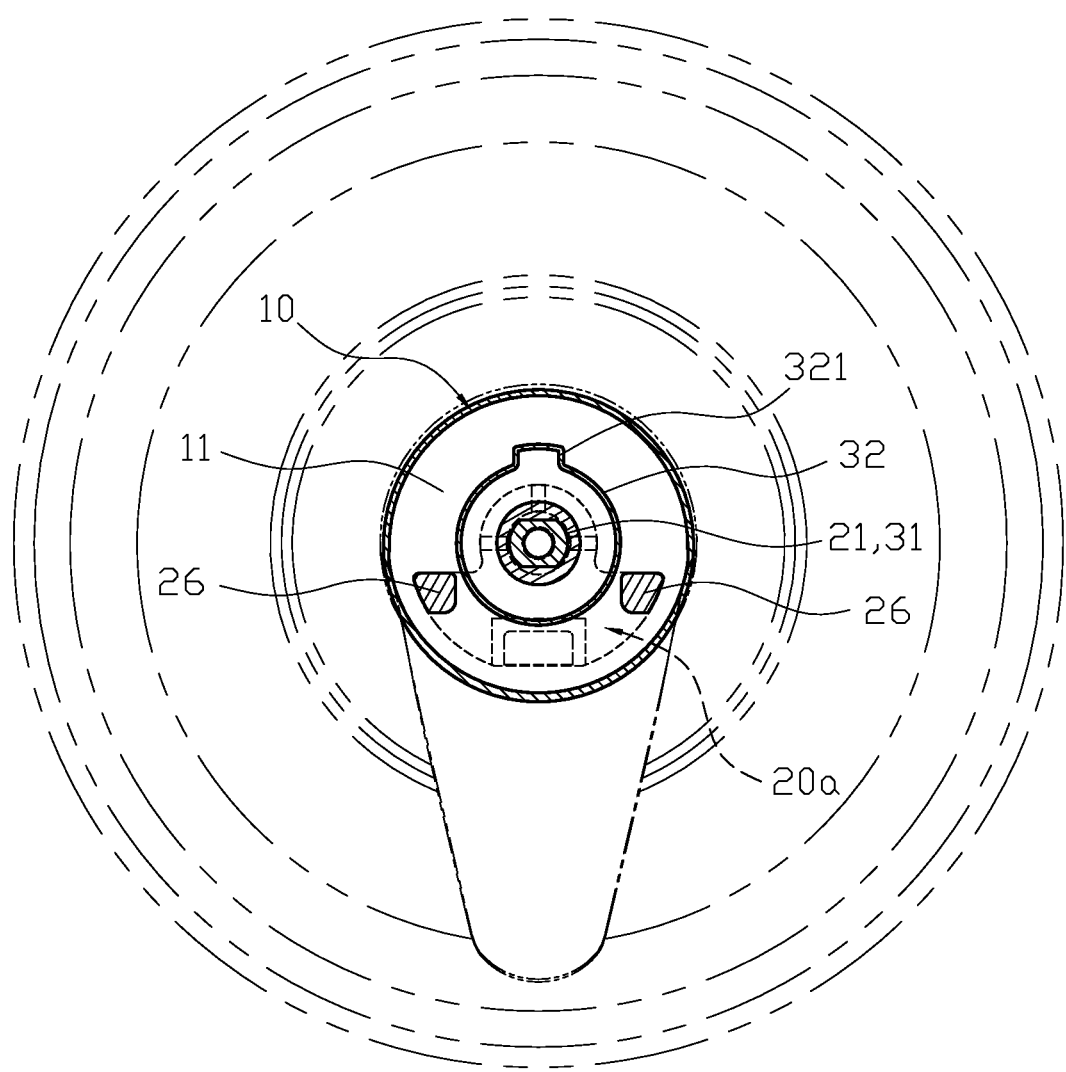
FIG. 5 illustrates a second sectional view of the first assembly type in the present invention.
Figure 6:
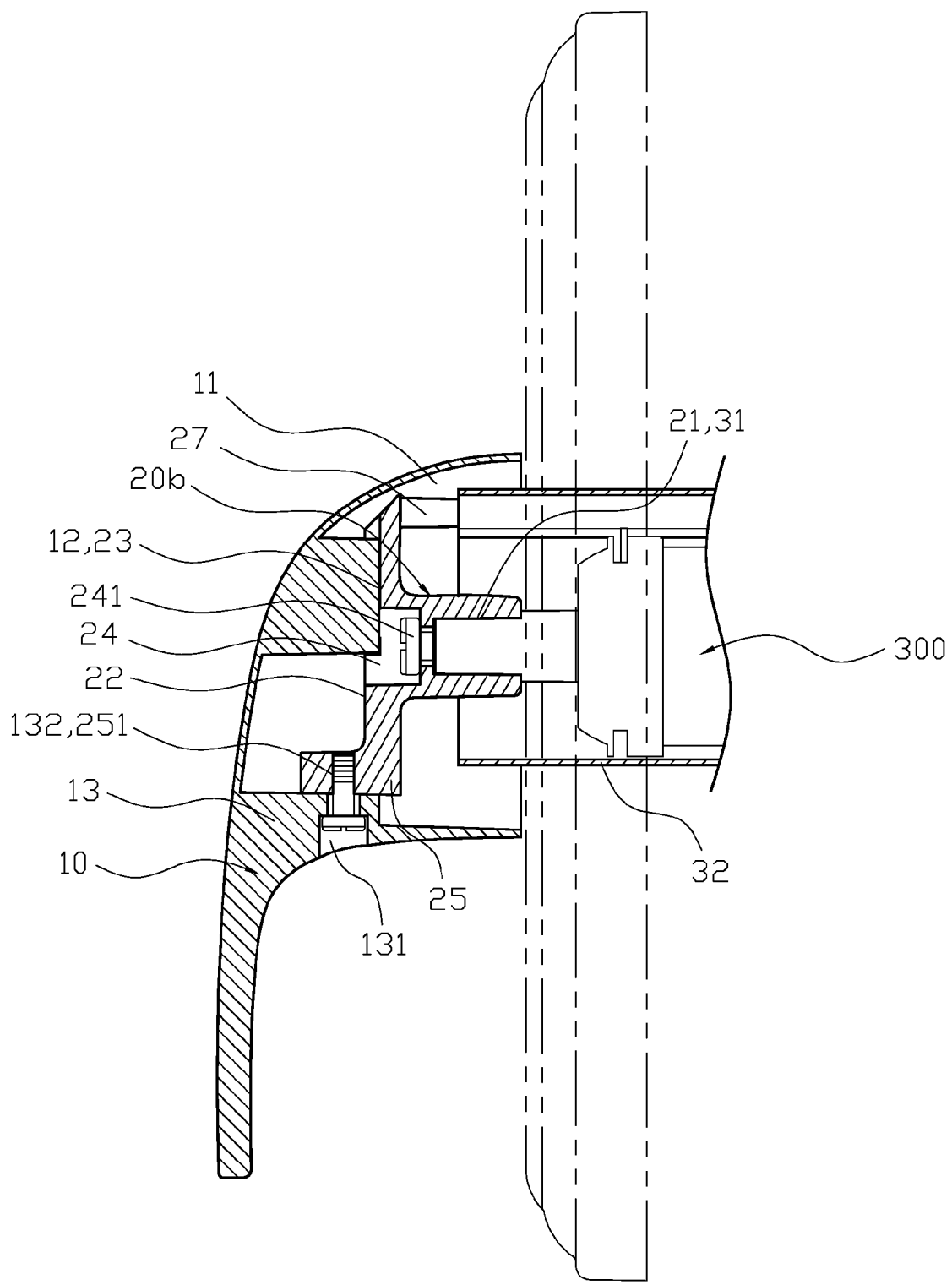
FIG. 6 illustrates a sectional view of the second assembly type in the present invention.

Referring to FIG. 2 for a practical use in the present invention, the control handle of the faucet can be conjugated with a first water control base (30) and a second control base (300) with different sizes. The water control bases (30) (300) protrudingly form a valve stick (31) that recessedly forms a connecting groove (311). A sleeve (32) is formed at outer periphery of the water control bases (30) (300) and the sleeve (32) protrudingly forms a stopping portion (321) located at the outer periphery in the axial direction. Referring to FIGS. 2, 5 and 6, when the control handle (10) is conjugated with the smaller water control base (30), the transforming head (20a) is used to cover the valve stick (31) of the water control base (30a) through the inserting slot (21) (see FIG. 3), and the screw locking unit (241) goes through the recessed slot (24) and is locked at the connecting groove (311) of the valve stick (31). Moreover, the receiving space (11) of the control handle (10) covers the transforming head (20a), so that the wedging rib (12) of the control handle (10) is engaged with the connecting slot (23) of the transforming head (20a) and the through hole (131) of the connecting block (13) of the control handle (10) is aligned with the connecting hole (251) of the connecting portion (25) of the transforming head (20a). The locking unit (132) further goes through the through hole (131) and is locked at the connecting hole (251) to complete the assembly and achieve the goal of the usage in smaller water control base (30). When the control handle (10) is rotated, it can drive the valve stick (31) to rotate to achieve the goal of controlling the temperature of the water flow. Also, when the stopping block (26) of the transforming head (20a) of the control handle (10) is against the stopping portion (321) of the sleeve (32), it can be secured at the stopping portion (321) of the water control base (30) to achieve the purpose of blocking (see FIG. 5 as well), so as to control the rotating angle of the control handle (10) as well as the water control base (30) with smaller size.

Figure 7:
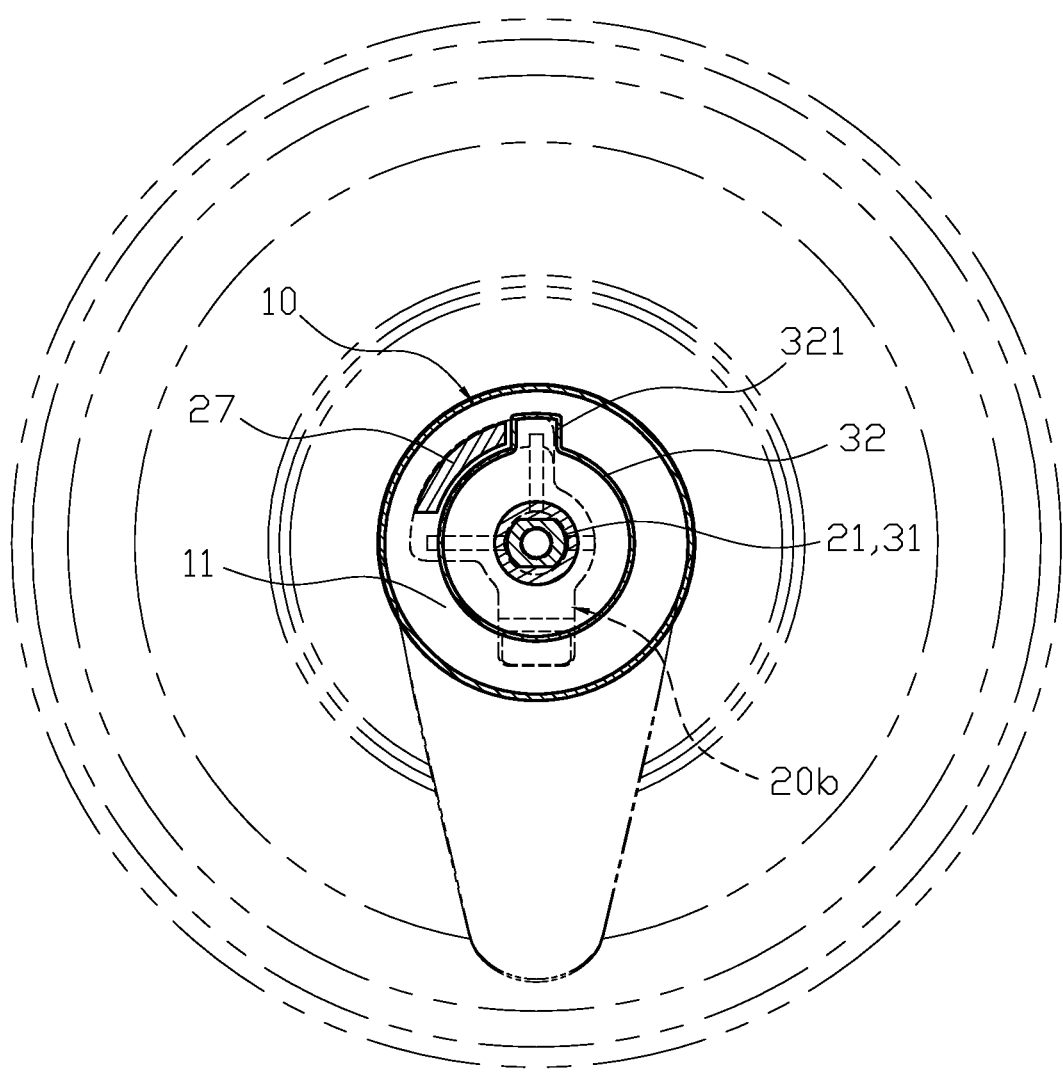
FIG. 7 illustrates a second sectional view of the second assembly type in the present invention.

Referring to FIGS. 2, 6, and 7, when the control handle (10) is conjugated with the larger water control base (300), the transforming head (20b) is used to cover the valve stick (31) of the water control base (300) through the inserting slot (21) (see FIG. 3), and the screw locking unit (241) goes through the recessed slot (24) and is locked at the connecting groove (311) of the valve stick (31). Moreover, the receiving space (11) of the control handle (10) covers the transforming head (20b), so that the wedging rib (12) of the control handle (10) is engaged with the connecting slot (23) of the transforming head (20b) and the through hole (131) of the connecting block (13) of the control handle (10) is aligned with the connecting hole (251) of the connecting portion (25) of the transforming head (20b). The locking unit (132) further goes through the through hole (131) and is locked at the connecting hole (251) to complete the assembly and achieve the goal of the usage in larger water control base (300). When the control handle (10) is rotated, it can drive the valve stick (31) to rotate to achieve the goal of controlling the temperature of the water flow. Also, when the stopping rib (27) of the transforming head (20b) of the control handle (10) is against the stopping portion (321) of the sleeve (32), it can be secured at the stopping portion (321) of the water control base (300) to achieve the purpose of blocking (see FIG. 7 as well), so as to control the rotating angle of the control handle (10) as well as the water control base (300) with larger size.

According to the structure in the abovementioned embodiments, the present invention is advantageous because the receiving space (11) of the control handle (10) has detachable transforming heads (20a) (20b), so the faucet handle in the present invention can be used in different water control bases (30) (300) with different sizes to increase the practicability of the faucet handle, and further increase the convenience during the assembly process.

Having described the invention by the description and illustrations above, it should be understood that these are exemplary of the invention and are not to be considered as limiting. Accordingly, the invention is not to be considered as limited by the foregoing description, but includes any equivalents.

What is claimed is:
1. A wall-mounted faucet control device including:
a control handle, one side of which recessedly forms a receiving space having two wedging ribs cross each other at the periphery of an opening of the receiving space, and having a connecting block protrudingly formed at the periphery of the opening of the receiving space, wherein connecting block has one through hole that provides a locking unit;
a first and a second transforming heads that have an inserting slot recessedly formed at one side of the transforming heads, and a connecting surface formed expandably on the other side thereof, wherein two connecting slots cross with each other are recessedly formed at the connecting surface, and the connecting slots are engaged with the wedging ribs of the control handle, wherein a recessed slot formed at a cross point of the connecting slots connects with the inserting slot and provides a screw locking unit, wherein the transforming heads extendedly and downward form a connecting portion that has a connecting hole therethrough, and the connecting hole is provided for the locking unit of the control handle to lock, and a stopping block is extendedly formed on both sides of the connecting portion of the first transforming head, while a stopping rib is extendedly formed near the top of the inserting slot of the second transforming head.

* * * * *